United States Patent
Vacek et al.

(10) Patent No.: US 6,415,609 B1
(45) Date of Patent: Jul. 9, 2002

(54) REPLACEABLE AFTERBURNER HEAT SHIELD

(75) Inventors: Larry Lee Vacek, West Chester; William Ralph Maskiell, Batavia, both of OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/809,547

(22) Filed: Mar. 15, 2001

(51) Int. Cl.[7] ................................. F02K 3/10
(52) U.S. Cl. .......................... 60/761; 60/765
(58) Field of Search .................. 60/761, 765, 766, 60/796, 798

(56) References Cited

U.S. PATENT DOCUMENTS

| | | | |
|---|---|---|---|
| 2,944,388 A | * 7/1960 | Bayer | ............ 60/765 |
| 3,800,530 A | * 4/1974 | Nash | ............ 60/761 |
| 4,185,458 A | 1/1980 | Ernst | |
| 4,315,401 A | 2/1982 | Beal et al. | |
| 4,901,527 A | 2/1990 | Nash et al. | |
| 4,989,407 A | 2/1991 | Grant, Jr. | |
| 5,076,062 A | 12/1991 | Abreu | |
| 5,297,391 A | * 3/1994 | Roche | ............ 60/761 |
| 5,335,490 A | 8/1994 | Johnson et al. | |
| 5,385,015 A | 1/1995 | Clements et al. | |
| 5,396,761 A | 3/1995 | Woltmann et al. | |
| 5,396,763 A | 3/1995 | Mayer et al. | |
| 6,125,627 A | * 10/2000 | Rice et al. | ............ 60/765 |

* cited by examiner

*Primary Examiner*—Michael Koczo
(74) *Attorney, Agent, or Firm*—Rodney M. Young; David E. Crawford (57) ABSTRACT

A heat shield for protecting a fuel injection tube of a turbine engine afterburner. The heat shield includes a base adapted for attachment to a duct member, the base having a first mounting surface, a first fastener hole, and a recess in the base. A housing encloses the fuel injection tube. The housing has an internal channel for receiving the fuel injection tube, a second mounting surface, a second fastener hole, and a tab protruding from the housing. The tab is sized and shaped for being received in the recess of the base. The housing may be secured to the base at a mounting position wherein the tab is received in the recess, the mounting surfaces are engaged, and the second fastener hole is positioned in registration with the first fastener hole whereby a fastener may be inserted to secure the housing to the base.

16 Claims, 6 Drawing Sheets

REPLACEABLE AFTERBURNER HEAT SHIELD

BACKGROUND OF THE INVENTION

The present invention relates generally to afterburners for aircraft gas turbine engines, and in particular to a readily replaceable heat shield for an afterburner fuel injection tube.

Afterburning or reheating is one method of augmenting the basic thrust of a turbine engine. An afterburner increases thrust by adding thermal energy to a stream of turbine exhaust gas and engine bypass air located aft of the core engine. The afterburner includes several fuel injection tubes, known as spray bars, for dispersing fuel into the stream of gas. Each tube extends radially inward from an outer wall into the engine exhaust and has multiple spray orifices for dispensing fuel. The afterburner also includes flame stabilization devices, known as flameholders, for creating regions of reduced gas velocity to facilitate effective combustion. The afterburner is typically located in close proximity to a mixing duct, or mixer, that combines a portion of the stream of bypass air with the turbine exhaust gas to improve performance. The mixing duct is a cylindrical shell with a plurality of circumferentially-spaced passages, known as chutes, for delivering bypass air into the stream of turbine exhaust gas.

Each of the fuel injection tubes of the afterburner is protected by a heat shield, a housing which encloses the tube and has an internal channel for delivering cooling air along the tube. A plurality of openings are spaced along the heat shield for alignment with the spray orifices to permit fuel to be injected from the tube into the gas stream.

Heat shields are periodically replaced due to burning damage, thermal cyclic fatigue, or coking residue. Ideally a heat shield should be replaceable in a short time so that aircraft down-time is minimized. Unfortunately, some types of heat shields require many hours to repair because they are not readily replaceable. For instance, an entire augmentor assembly must first be removed from an engine before obtaining sufficient access to remove some heat shields. On other designs, the heat shield is permanently attached to a support structure, such as by welding. Replacement of these heat shields requires substantial time and expense.

SUMMARY OF THE INVENTION

In general, a heat shield of the present invention protects a fuel injection tube of a turbine engine afterburner. The afterburner has a generally cylindrical outer wall and a duct member spaced inwardly from the outer wall defining a boundary between a core duct for flow of turbine exhaust gas and a bypass duct for flow of cooling air. The fuel injection tube extends from the outer wall inwardly through an opening in the duct member to the core duct. A first portion of the fuel injection tube is in the bypass duct and a second portion of the fuel injection tube is in the core duct. The heat shield comprises a base for supporting the heat shield in the core duct, the base being adapted for attachment to the duct member. The base has a front side with a first mounting surface, a first fastener hole extending through the base, and a recess in the base. A housing encloses the second portion of the fuel injection tube. The housing has an internal channel therein open at an end thereof for receiving the fuel injection tube, a second mounting surface, a second fastener hole, and a tab protruding from the housing. The tab is sized and shaped for being received by the recess in the base. The housing may be releasably secured to the base at a mounting position on the base wherein the tab is received by the recess, the mounting surfaces are engaged, and the second fastener hole is positioned in aligned registration with the first fastener hole so that a fastener may be inserted to secure the housing to the base.

In another aspect, a combination of the present invention includes a mixer chute and an attachable heat shield for an afterburner of a gas turbine engine. The afterburner has a generally cylindrical outer wall, a duct member spaced inwardly from the outer wall defining a boundary between a core duct for flow of turbine exhaust gas and a cooling duct for flow of cooling air, and a fuel injection tube extending from the outer wall inwardly to the core duct. A first portion of the tube is in the cooling duct and a second portion of the tube is in the core duct. The mixer chute comprises a passageway extending from the duct member into the core duct for delivering cooling air from the cooling duct into the flow of turbine exhaust gas. The heat shield comprises a housing releasably attachable to the chute at a mounted position. The housing has an internal channel for receiving and enclosing the fuel injection tube, and at least one fastener hole in the housing for receiving a fastener to releasably attach the housing to the chute at the mounted position.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
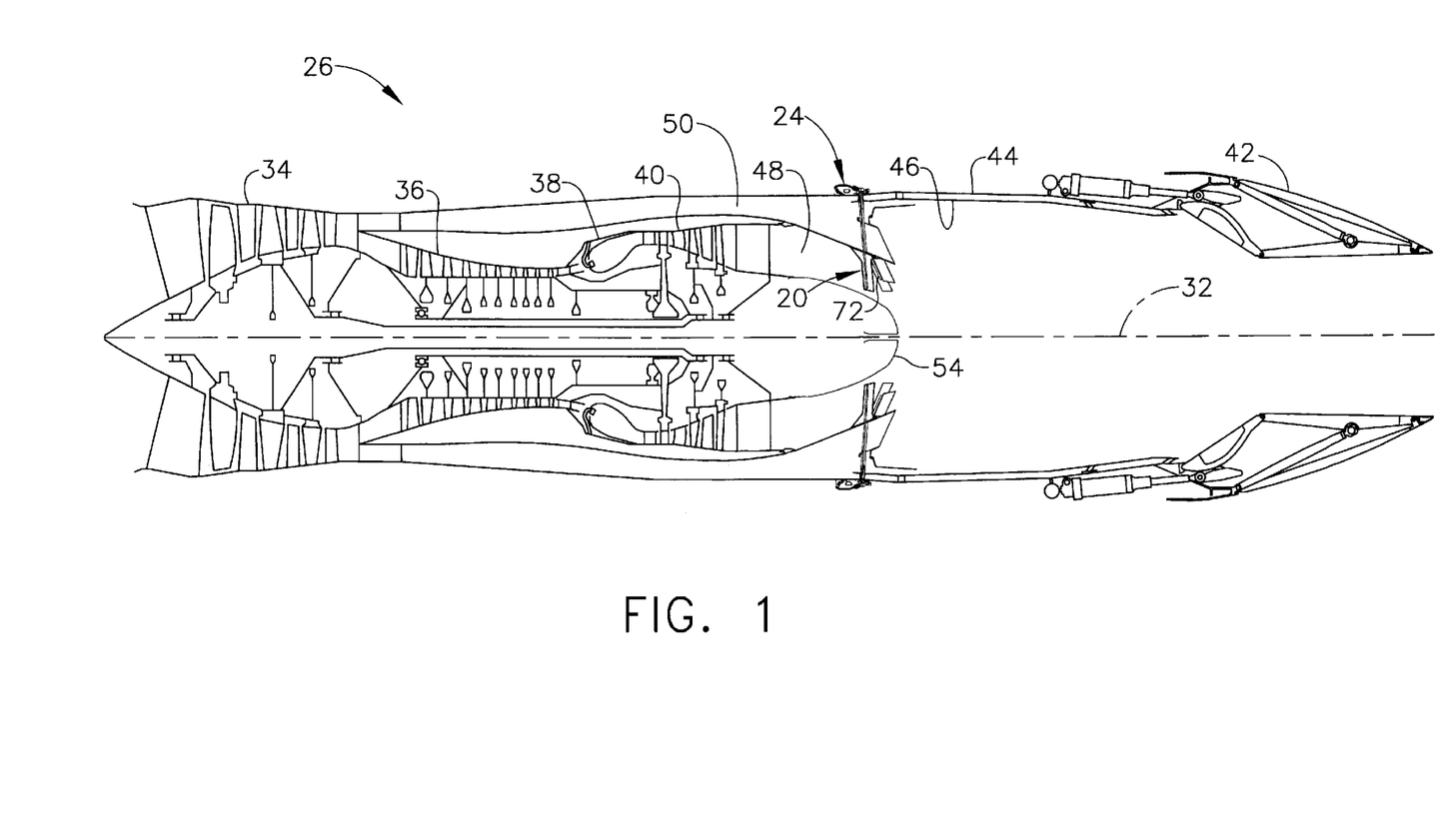
FIG. 1 is a schematic longitudinal section of an aircraft gas turbine engine having a radial-type afterburner.
Figure 2:
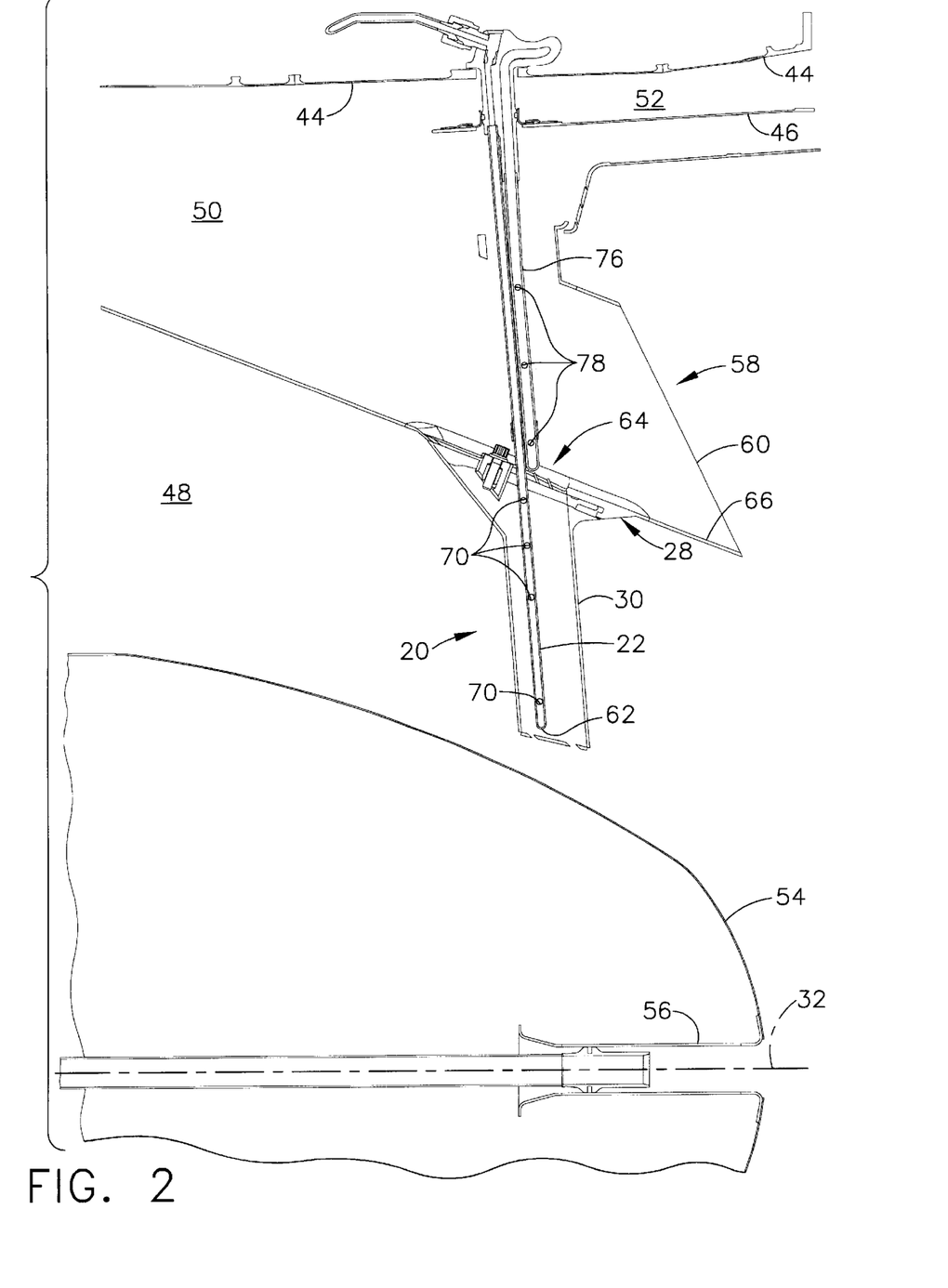
FIG. 2 is an enlarged fragment of FIG. 1 illustrating additional details of an afterburner section of the engine having a heat shield according to the present invention.

Referring now to the drawings and in particular to FIGS. 1 and 2, a heat shield of the present invention is indicated generally at 20. The heat shield 20 protects a fuel injection tube 22 (FIG. 2) installed in an afterburner or augmentor 24 of a conventional aircraft gas turbine engine 26. The heat shield 20 comprises two components, a base 28 and a housing 30 releasably attached to the base. The housing 30 surrounds the fuel injection tube 22 and, when damaged, is readily replaceable.

As illustrated in FIG. 1, the engine 26 is roughly cylindrically-shaped about a central axis 32 and includes, sequentially along its length, a fan 34, a compressor 36, a combustor 38, a turbine 40, the afterburner 24, and an exhaust nozzle 42. Except as further described herein, the engine 26 has a conventional construction. The afterburner 24 is provided for increasing the thrust of the engine as needed for enhanced aircraft acceleration, maneuverability, and/or speed. The afterburner 24 has a generally cylindrical outer wall 44 and a liner 46 spaced inside the outer wall. Air enters the afterburner 24 from a central core duct 48 and an outer bypass duct 50. The core duct 48 delivers turbine exhaust gas and the bypass duct 50 delivers air from the fan 34 which has bypassed the compressor 36, combustor 38 and turbine 40. A portion of the air traveling through the bypass duct 50 enters a cooling air passage 52 defined by the outer wall 44 and the liner 46 for delivering cooling air to the exhaust nozzle 42.

At all engine power settings, the temperature of the turbine exhaust gas is substantially higher than that of the bypass air. The outer wall 44 and the liner 46 typically are not designed to withstand exposure to the high temperatures, and accordingly are cooled by the bypass air. The bypass air is preferably drawn from the fan 34, in which case the bypass air may be referred to as fan air. However, it is understood that the cooling air could originate at a compressor bleed port, ram intake duct, or refrigerant cycle system without departing from the scope of the invention. The engine 26 has an aft centerbody 54 in the center of the core duct 48. The aft centerbody 54 is a generally conical shell having a central vent tube 56.

As illustrated in FIG. 2, the afterburner 24 also includes a mixer, indicated generally at 58, positioned between the core duct 48 and bypass duct 50 for combining a portion of the stream of cooling air traveling through the bypass duct with the turbine exhaust gas traveling through the core duct. The mixer 58 is an annular shell having at least one passageway, or chute 60, for delivering a portion of the cooling air from the bypass duct 50 into the stream of turbine exhaust gas in the core duct 48. The mixer 58 preferably has a plurality of chutes 60, e.g., sixteen equally spaced chutes about a circumference of the engine duct.

Referring to FIG. 2, at least one fuel injection tube 22 extends from the outer wall 44 inwardly to a cantilevered end 62 inside the core duct 48. The fuel injection tube 22, also referred to as a spraybar, originates at a fuel manifold and distributor (not shown) located outside the outer wall 44. The tube 22 is preferably a continuous, single-wall pipe which passes through the mixer 58 and through an opening, generally indicated at 64, in an inner wall 66 of the chute and into the core duct 48. A first outer portion of the fuel injection tube 22 is located generally in the bypass duct 52, where it is exposed to a relatively cool bypass air. A second inner portion is located generally in the core duct 48, where it is exposed to a relatively high temperature turbine exhaust gases. A plurality of spray orifices 70 are disposed along the inner portion of the fuel injection tube 22 for dispensing fuel to the turbine exhaust gas at several radial locations in the core duct 48.

In a typical radial-type afterburner there are a plurality of fuel injection tubes 22 spaced at equal angular intervals about the circumference of the afterburner 24. For example, there may be sixteen fuel injection tubes 22 spaced at equal angular spacings about its circumference. Each tube 22 is at a circumferential location which corresponds with a mixer chute 60 of the mixer 58, and accordingly each tube extends through the chute and through the opening 64 in the wall 66 into the core duct 48. A second set of fuel injection tubes 72 (partially shown on FIG. 1) are circumferentially spaced between chutes 60 so that they are exposed to core air along substantially their entire lengths. The heat shield 20 of the present invention is primarily adapted for protecting those fuel injection tubes 22 in the first mentioned set. However, it is understood that the heat shield 20 can be used with tubes 72 of the second set without departing from the scope of this invention.

Each of the tubes 22 is paired with a second, shorter fuel injection tube 76 for dispensing fuel to the bypass air in the chute 60. The second tube 76 has spray orifices 78 disposed along the tube for dispensing fuel at several radial locations in the chute 60. When operation of the afterburner 24 is initiated, fuel is first delivered through the fuel injection tube 22 to the core duct and subsequently through the second fuel injection tube 76 to the bypass duct.

Figure 3:
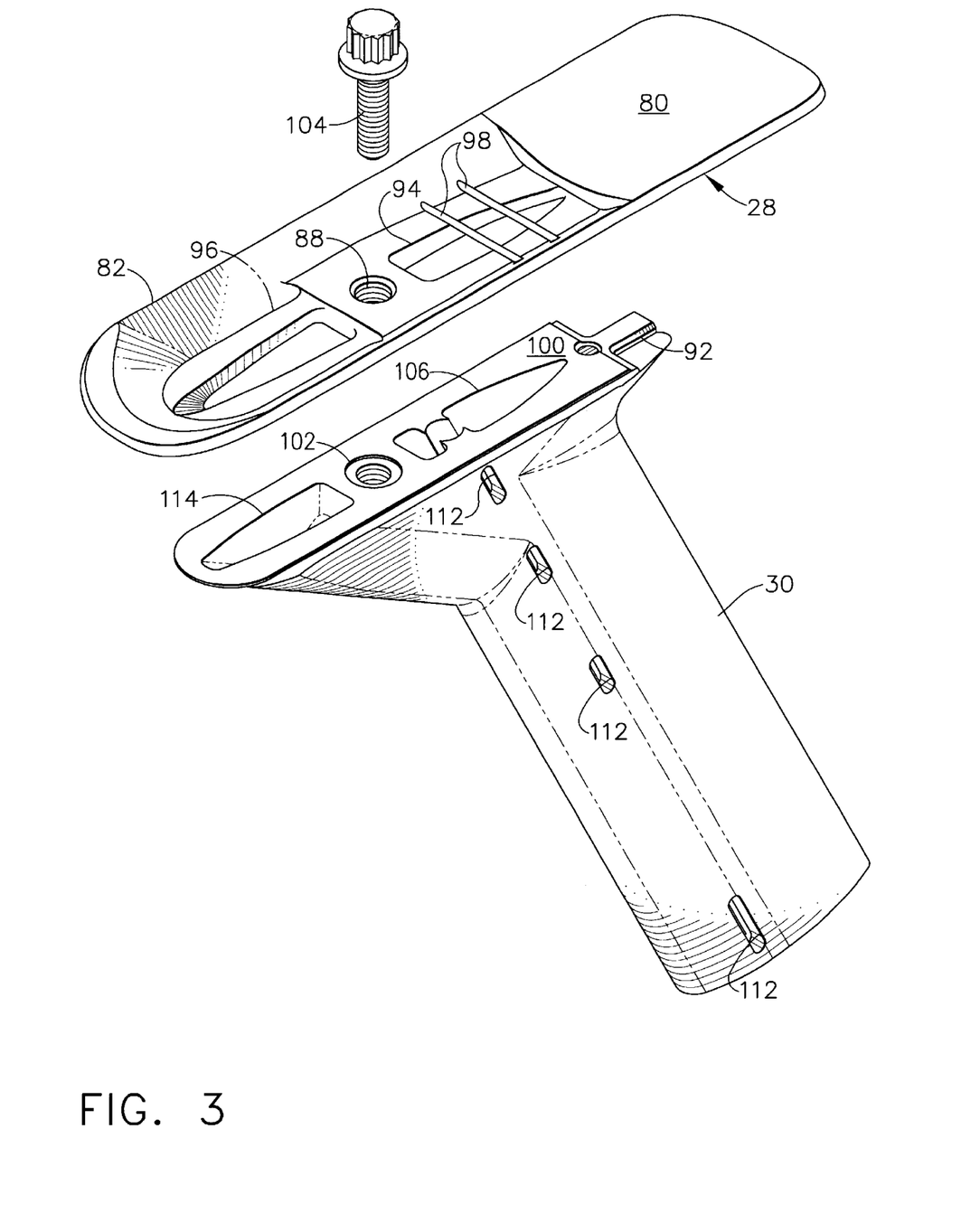
FIG. 3 is an exploded perspective of the heat shield including a base and replaceable housing.
Figure 4:
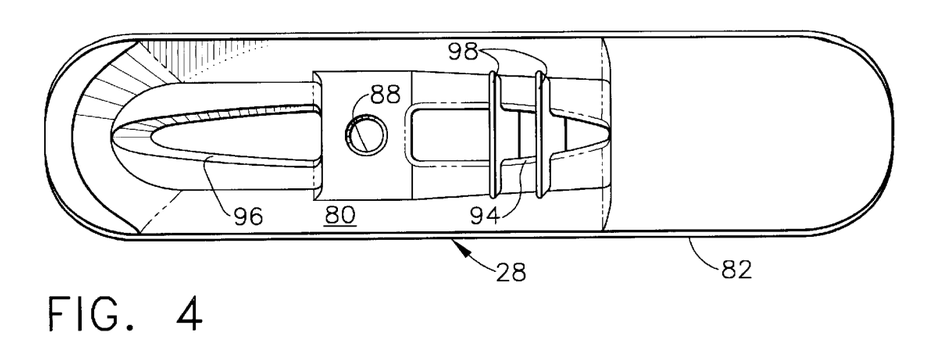
FIGS. 4–6 are outer plan view, side elevation, and inner plan views, respectively, of the base of the heat shield.
Figure 5:
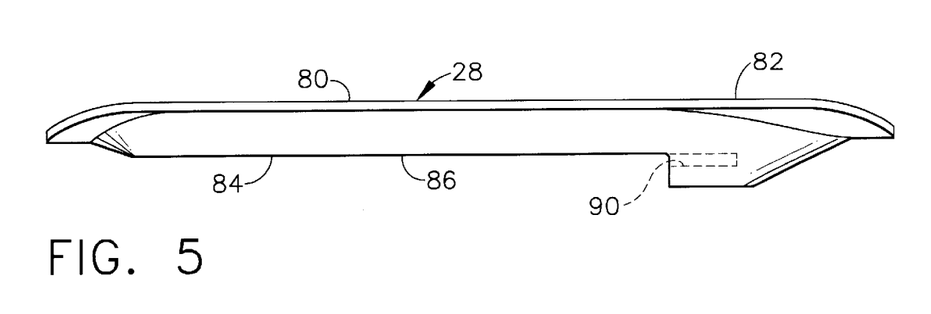
Figure 6:
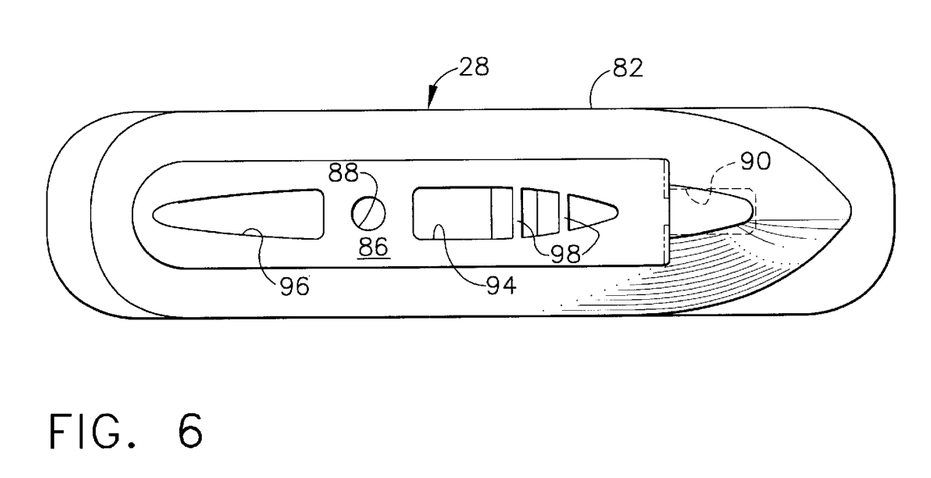

Referring to FIG. 3, the base 28 is configured for supporting the heat shield 20 in the core duct 48. The base 28 is a generally thin profile body for attaching the heat shield 20 to the wall 66 of the mixer chute 60. An outer face 80 of the base 28 is contoured to match the chute 60 so that the base can firmly engage the wall 66 with contact around an entire outer rim 82 of the base. The base 28 is fixedly attached to the chute 60 as by welding the outer rim 82 to the wall 66 of the chute. It is understood that other, non-fixed methods of attachment do not depart from the scope of this invention. Unlike the housing 30, the base 28 does not receive damage during afterburner operation because of its thin profile, its close proximity to the cooled mixer chute 60, and its greater separation than the housing from a flame. The base 28 is located on the chute 60 at a position covering the opening 64 in the wall 66 of the chute. Although in the preferred embodiment the base 28 is configured for attaching to the mixer chute 60, it is understood that the base may be configured for attaching to any duct member, such as the liner 46 or outer wall 44, without departing from the scope of this invention.

An inner face 84 of the base 29 includes a first mounting surface 86 for mounting the housing 30. Preferably, the first mounting surface 86 is flat so that the housing 30 can be positioned on the base by moving the housing parallel to the surface, as described hereinafter. A non-flat mounting surface, however, is feasible. A first fastener hole 88 extends through the base 28 from the outer face 80 to the inner face 84, generally at a center of the first mounting surface 86. A recess 90 is formed in the base 28 for receiving a corresponding tab 92 on the housing 30. The recess 90 is positioned adjacent to the first mounting surface 86. Other arrangements and locations of the fastener hole 88 and recess 90 do not depart from the scope of this invention.

The base 28 has a first opening 94 and a second opening 96 which extend through the base from the outer face 80 to the inner face 84. Both openings 94, 96 are configured for conveying bypass air from the chute 60 to the housing 30 for cooling the housing and fuel injection tube 22. The first opening 94 is positioned for receiving the fuel injection tube 22. Two cross fins 98 are mounted across the first opening 94 to prevent the fuel injection tube 22 from being installed through an incorrect region of the first opening from where it would be further inserted incorrectly into the housing.

Figure 7:
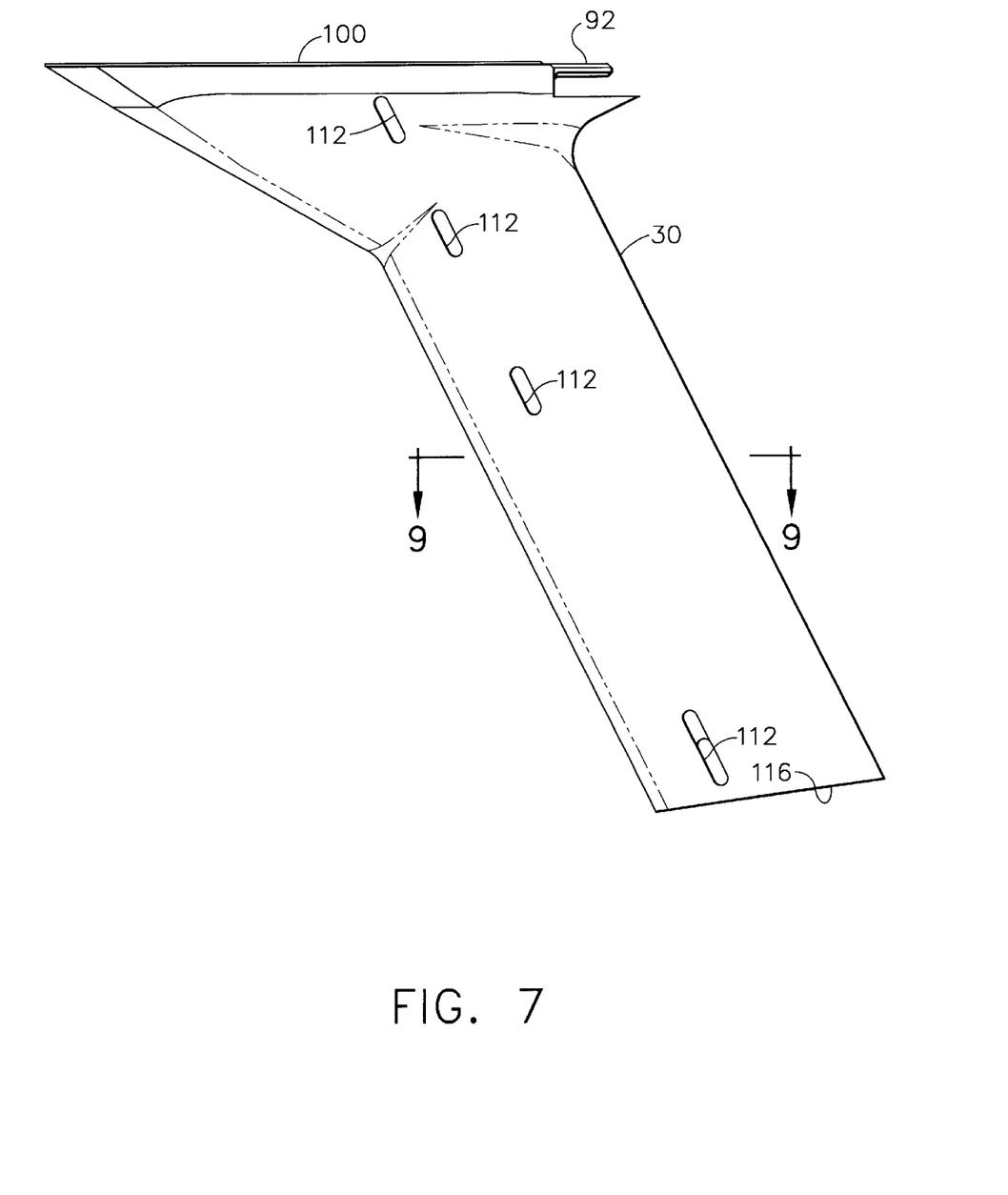
FIG. 7 is a side elevation of the housing of the heat shield.
Figure 8:
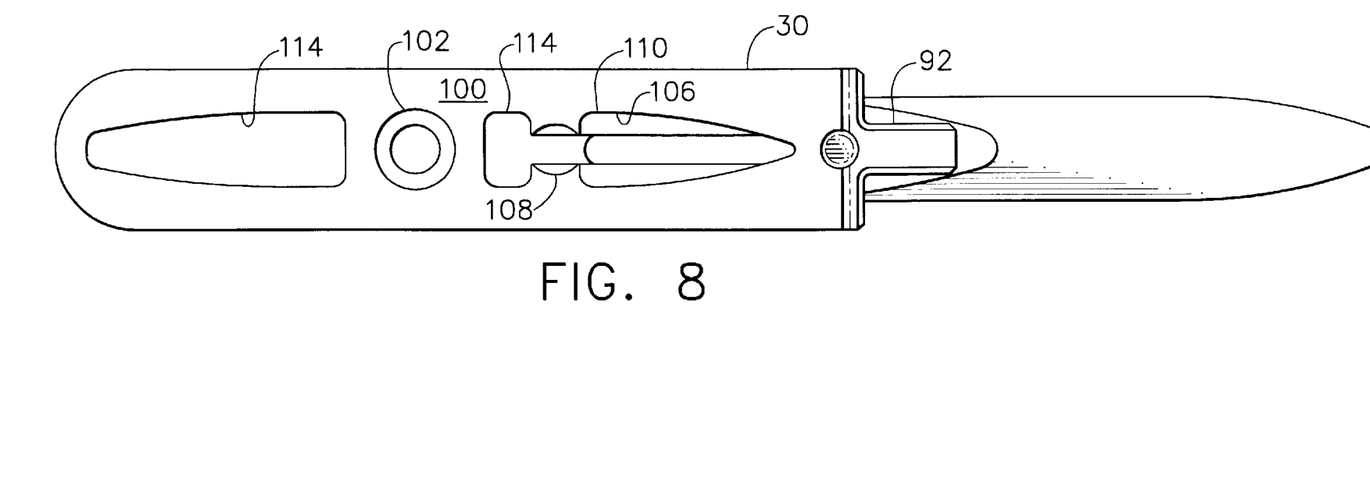
FIG. 8 is a top plan of the housing.
Figure 9:
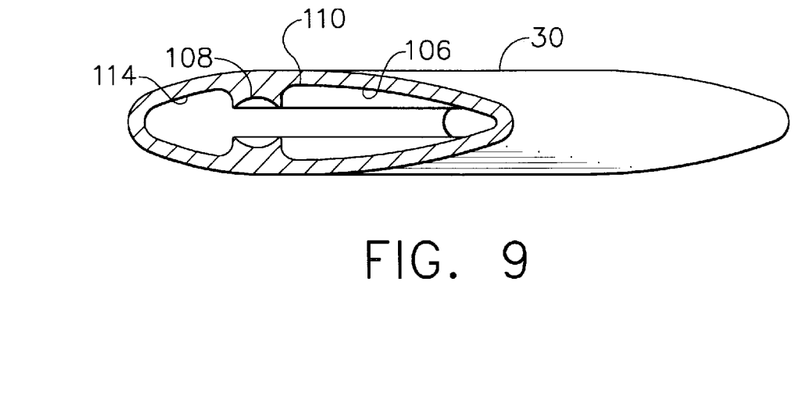
FIG. 9 is a section taken on line 9—9 of FIG. 7.

The housing 30 encloses the second portion of the fuel injection tube 22 and shields it from the heat of the turbine exhaust gas in the core duct 48. Referring to FIGS. 7–9, the housing 30 has a generally thin airfoil shape for minimizing flow disturbance and loss of pressure in the stream of turbine exhaust gas that flows past the housing.

A second mounting surface 100 and a second fastener hole 102 are positioned on the housing 30 for mounting the housing on the base 28 in a cantilever arrangement. The second mounting surface 100 is configured to closely conform with the first mounting surface 86 on the base 28. The housing 30 may be secured to the base 28 at a mounting position (FIG. 2) on the base wherein the tab 92 is received in the recess 90, the mounting surfaces 86, 100 are in face-to-face engagement, and the second fastener hole 102 is positioned in registration with the first fastener hole 88 so that a fastener, such as a bolt 104 (FIG. 3), may be inserted to secure the housing to the base. The second fastener hole 102 is preferably threaded and fitted with a self-locking insert (not shown). The bolt 104 is protected from heat, with its head being located inside the chute 60 and exposed to cooling air, thereby reducing the potential for seizing during extended engine operation.

The tab 92 extends from the second mounting surface 100, being generally in the same plane, and the tab is sized and shaped for being received by the recess 90 of the base. The tab 92 is shorter than a maximum length of the recess 90 to allow for thermal expansion of the housing 30 in the axial direction. The housing 30 therefore is not thermally locked to the base 28 and mixer chute 60. The tab 92 is positioned on the housing in spaced relation from the second fastener hole 102. The tab 92 extends longitudinally generally in line with the second fastener hole 102, such that a longitudinal axis of the tab, if extended beyond the tab, passes through the second fastener hole. The arrangement permits engagement of the tab 92 against the inside of the recess 90 to prevent any rotation of the housing 30 relative to the base 28 about an axis of rotation coincident with a longitudinal axis of the bolt fastener 104. That provides advantages of a firm attachment and, while securing the housing 30 to the base 28, that the bolt 104 may be tightened without induced rotation of the housing.

The housing 30 is formed to have a first internal channel 106 extending through the housing for enclosing the fuel injection tube 22 and for conveying cooling air through the housing. The channel 106 has an opening on the second mounting surface 100 for receiving the fuel injection tube. As shown in section in FIGS. 8 and 9, the channel 106 has a generally round, central portion 108 and a wider end portion 110 adjacent the central portion. The central portion 108 is sized for receiving the fuel injection tube 22. The end portion 110 of the channel permits cooling air to flow through the housing 30, and along the fuel injection tube 22, to remove heat from the housing and tube. The cooling air flows from the mixer chute 60, through the base 28 and into the channel 106 of the housing. A plurality of openings 112 (FIG. 7) are spaced along the central portion 108 of the internal channel 106 for alignment with the spray orifices 70 of the fuel injection tube 22 to permit fuel to be dispensed from the tube into the gas stream. The housing 30 has a second internal channel 114 (FIGS. 8 and 9) for cooling a leading edge of the housing and for additional cooling of the fuel injection tube 22. The second channel 114 is bifurcated in two segments, each having an opening on the second mounting surface (on opposite sides of the second fastener hole). The two segments combine into one channel 114 internally in the housing.

The openings of the first and second internal channels 106, 114 on the second mounting surface 100 and the first and second openings 94, 96 of the first mounting surface 86 are positioned for registration when the housing is secured to the base at the mounting position. Therefore the bypass duct 50 is in fluid communication with the first and second internal channels 106, 114 in the housing. The first and second internal channels 106, 114 extend the entire length of the housing 30, so that cooling air flows throughout and cools the entire housing and fuel injection tube 22. Vent holes (not shown) extend from each channel at an end 116 of the housing to permit cooling air to exit from the housing into the stream of turbine exhaust gas.

The base 28 and housing 30 of the heat shield 20 are preferably formed of suitable high temperature materials such as a castable cobalt alloy (e.g., Mar-M-509), or a nickel based alloy (e.g., INCONEL) (INCONEL is a registered trademark of Inco Alloys International, Inc. of Huntington, W. Va.).

In operation, the heat shield 20 is used for protecting the fuel injection tube 22 during operation of the engine 26. At the mounting position, the housing is secured to the base 28 by the bolt fastener 104 with the first and second mounting surfaces 86, 100 in engagement and the tab 92 inserted in the recess 90. The base 28 is fixedly attached to the wall 66 of the mixer chute 60 over the opening 64 in that wall. Internal channels 106, 114 of the housing receive cooling air from the bypass duct 50 to remove heat, with openings of the channels being aligned with openings 94, 96 of the base 28. Face-to-face engagement of the mounting surfaces 86, 100 results in very little leakage of cooling air at the juncture.

When the housing 30 becomes damaged, it may be readily replaced. First, the engine 26 is removed from the aircraft to gain access to an external side of the outer wall 44. The fuel injection tube 22 is removed by pulling it radially outward from the external side, sliding it out from the housing 30. The bolt 104 is removed and the damaged housing 30 is slid in a direction generally parallel the first and second mounting surfaces 86, 100 such that the tab 92 is withdrawn from the recess 90. The housing 30 is accessible from a position within the engine duct. The housing 30 is then free from the base 28 and may be removed. A new housing 30 is installed by sliding the housing and the second mounting surface 100 along a direction parallel the first mounting surface 86, into the mounting position wherein the mounting surfaces are in engagement and the tab 92 is inserted into the recess 90. The bolt 104 is inserted in position in the mixer chute 60 and into the fastener hole 88 in the back side 80 of the base. The bolt 104 extends into the second fastener hole 102 of the housing 30, and as it is tightened, rotation of the housing is prevented by engagement of the tab 92 in the recess 90. The fuel injection tube 22 is then inserted into the assembly, through the base 28 and the round, central portion 108 of the first internal channel 106 in the housing.

Significantly, the replacement of the housing 30 does not necessitate that the mixer 58 or other components of the afterburner 28 be removed or disassembled for gaining sufficient access. Further, the heat shield 20 is simple in construction and replacement is relatively quick, with only one fastener, reducing repair time and expense.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A heat shield for protecting a fuel injection tube of a turbine engine afterburner, the afterburner having a generally cylindrical outer wall and a duct member spaced inwardly from the outer wall and defining a boundary between a core duct for flow of turbine exhaust gas and a bypass duct for flow of cooling air, the fuel injection tube extending from the outer wall inwardly through an opening in the duct member to the core duct, a first portion of the fuel injection tube in the bypass duct and a second portion of the fuel injection tube in the core duct, the heat shield comprising:

a base for supporting the heat shield in the core duct, the base being adapted for attachment to said duct member, the base having a front side with a first mounting surface, a first fastener hole extending through the base, and a recess in the base;

a housing for enclosing said second portion of the fuel injection tube, the housing having an internal channel therein open at an end thereof for receiving said fuel injection tube, a second mounting surface, a second fastener hole, and a tab protruding from said housing, the tab being sized and shaped for being received in said recess of the base;

wherein the housing may be releasably secured to the base at a mounting position on the base in which the tab is received in said recess, the mounting surfaces are engaged, and the second fastener hole is positioned in aligned registration with the first fastener hole so that a fastener may be inserted to secure the housing to the base.

2. A heat shield as set forth in claim 1 wherein said tab is positioned on the housing in spaced relation from the second fastener hole and configured such that engagement of the tab with the base in said recess prevents rotation of the housing relative to the base when the housing is at said mounting position.

3. A heat shield as set forth in claim 2 wherein said tab extends from said second mounting surface.

4. A heat shield as set forth in claim 3 wherein the tab extends longitudinally in a direction aligned with the second fastener hole.

5. A heat shield as set forth in claim 1 wherein said first and second mounting surfaces are generally flat.

6. A heat shield as set forth in claim 5 wherein said first and second fastener holes are located in said first and second mounting surfaces, respectively.

7. A heat shield as set forth in claim 1 wherein said base has a thin profile.

8. A heat shield as set forth in claim 1 wherein the base has an opening extending therethrough for receiving the fuel injection tube.

9. A heat shield as set forth in claim 8 wherein said opening through the base is positioned such that when the housing is secured to the base at said mounting position, the opening is in registration with said open end of the internal channel of the housing.

10. A heat shield as set forth in claim 9 wherein the base has a second opening extending therethrough and the housing has a second internal channel open at an end thereof on the second mounting surface, the second opening being positioned on the first mounting surface for registration with said open end of the second internal channel such that when the housing is at the mounting position, the bypass duct is in fluid communication with the second internal channel of the housing.

11. A heat shield as set forth in claim 1 wherein said internal channel of the housing comprises a first internal channel and the heat shield further comprises a second internal channel open at an end thereof on the second mounting surface, said second internal channel for receiving flow of cooling air from the bypass duct and conveying said flow along the housing.

12. A heat shield as set forth in claim 1 in combination with the turbine engine.

13. In combination, a mixer chute and attachable heat shield for an afterburner of a gas turbine engine, the afterburner having a generally cylindrical outer wall, a duct member spaced inwardly from the outer wall and defining a boundary between a core duct for flow of turbine exhaust gas and a cooling duct for flow of cooling air, and a fuel injection tube extending from the outer wall inwardly to the core duct, a first portion of the tube in the cooling duct and a second portion of the tube in the core duct, the mixer chute comprising a passageway extending from the duct member into the core duct for delivering cooling air from the cooling duct into the flow of turbine exhaust gas; and the heat shield comprising a housing releasably attachable to said chute at a mounted position, the housing having an internal channel for receiving and enclosing said fuel injection tube, and at least one fastener hole in the housing for receiving a fastener to releasably attach the housing to the chute at the mounted position.

14. A combination as set forth in claim 13 wherein the heat shield further comprises a base attached to the mixer chute, said base being adapted for releasably securing the housing to the base at a mounting position.

15. A combination as set forth in claim 14 wherein the base has a first mounting surface and the housing has a second mounting surface, said mounting surfaces being engaged at said mounting position.

16. A combination as set forth in claim 15 wherein the base has a recess and the housing has a tab protruding from the housing, the tab being received by the recess at said mounting position.

* * * * *